Aug. 28, 1962 P. H. BARTLETT 3,051,335
TRAILER ELEVATOR
Filed July 15, 1959 4 Sheets-Sheet 1

INVENTOR.
Percy H. Bartlett,
BY Parker & Carter
Attorneys.

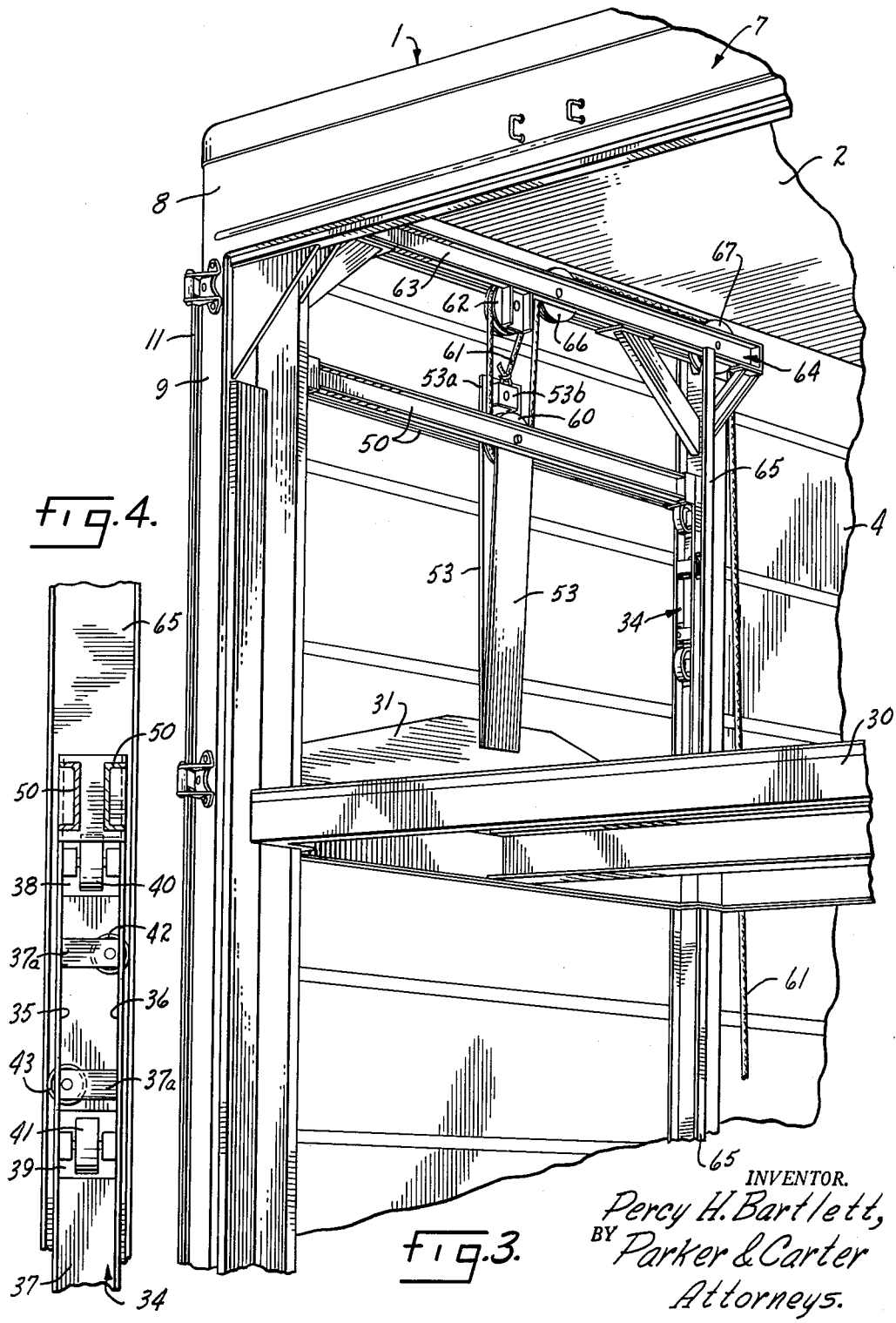

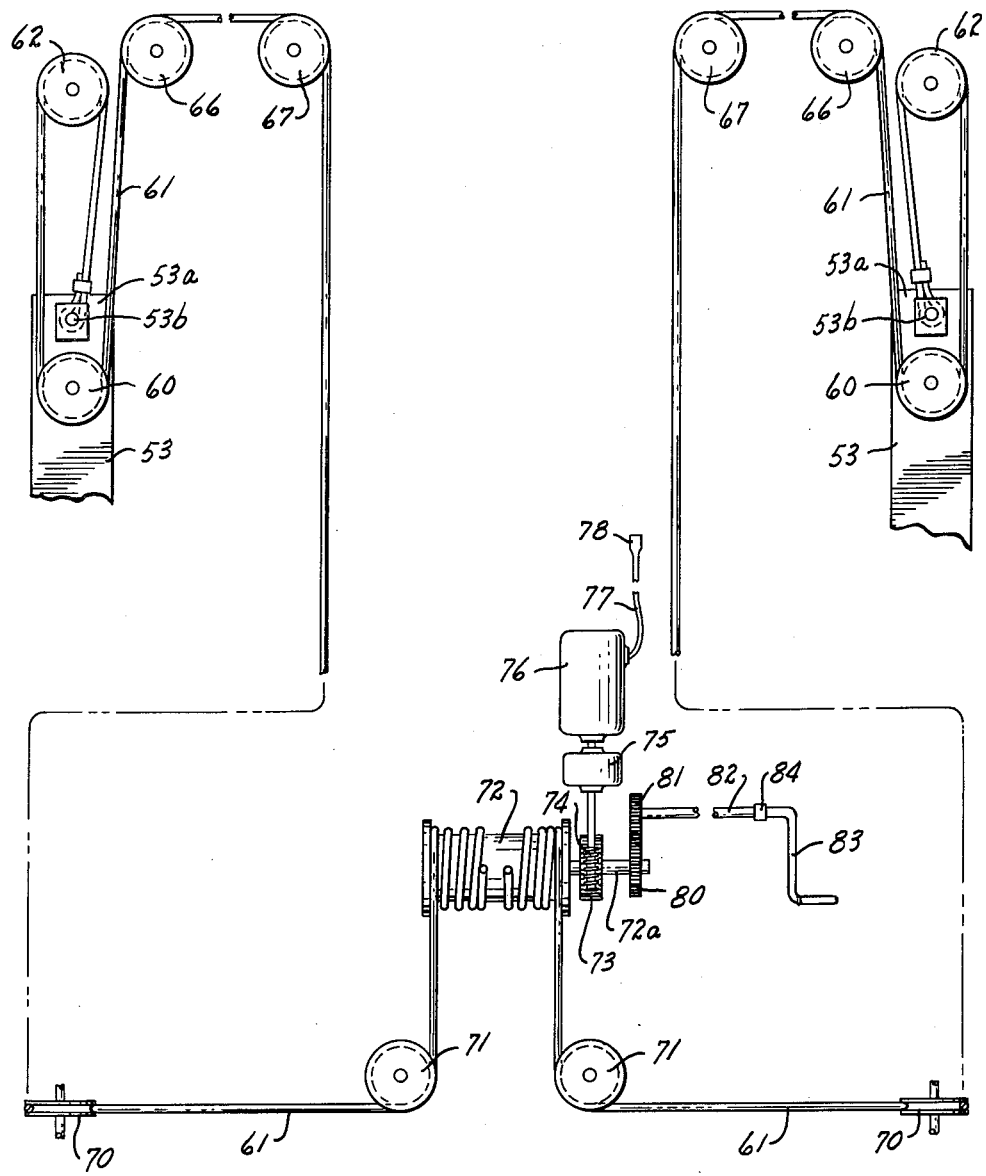

United States Patent Office 3,051,335
Patented Aug. 28, 1962

3,051,335
TRAILER ELEVATOR
Percy H. Bartlett, Riverside, Ill., assignor to Bartlett Trailer Corporation, Chicago, Ill., a corporation of Illinois
Filed July 15, 1959, Ser. No. 827,296
2 Claims. (Cl. 214—75)

This invention relates to trucks and truck trailers and has particular relation to the provision of loading and off-loading means therefor.

One purpose of the invention is to provide a loading and off-loading mechanism which shall be transportable with a vehicle body or trailer.

Another purpose of the invention is to provide an elevator means for trailers which has the additional function of serving as a portion of said trailer in normal operation of said trailer.

Another purpose is to provide loading and off-loading elevator means for trailers wherein the elevator means has a floor element effective to serve an additional function as a portion of the floor of the trailer.

Another purpose is to provide an elevator means for trailers and the like which shall be both mechanically and manually operable.

Another purpose is to provide a loading and off-loading elevator means of maximum simplicity and economy in manufacture and simplicity and reliability in operation.

Another purpose is to provide a trailer having an integral loading and off-loading means.

Another purpose is to provide a trailer having an integral loading and off-loading means and closure means therefor.

Another purpose is to provide a trailer having an integral loading and off-loading means positionable at a plurality of points in relation to said trailer.

Another purpose is to provide a trailer having a superstructure integrally incorporating a loading and off-loading elevator capable of facilitating loading and off-loading at a plurality of levels.

Another purpose is to provide a loading and off-loading mechanism for trailers which is positionable at a plurality of levels from ground level to a point above the trailer's floor.

Another purpose is to provide an elevator means for trailers and the like having support and guide means effective to maintain said elevator in horizontal position.

Other purposes will appear from time to time during the course of the specification and claims.

Like parts are indicated by like numerals throughout the specification and claims.

Figure 1:
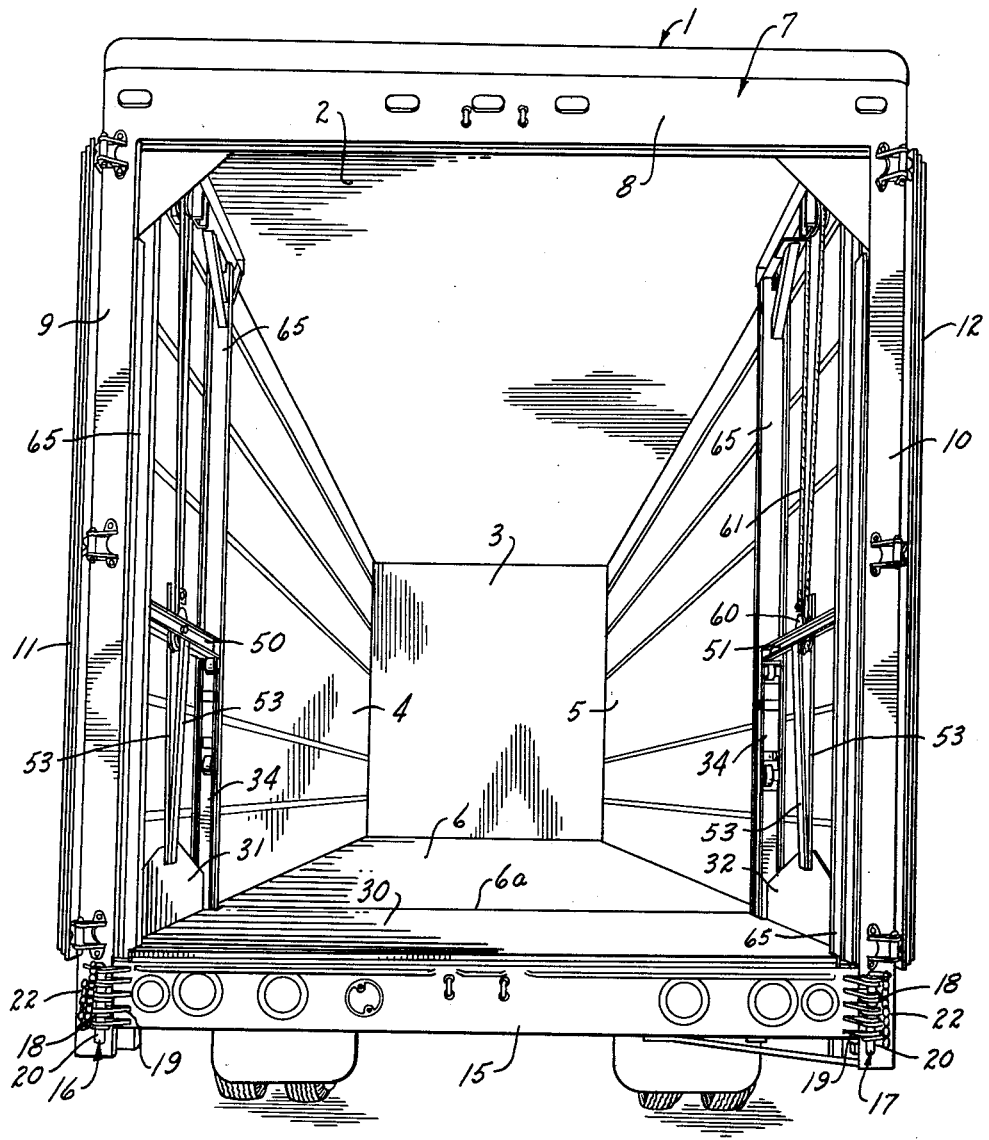
Figure 2:
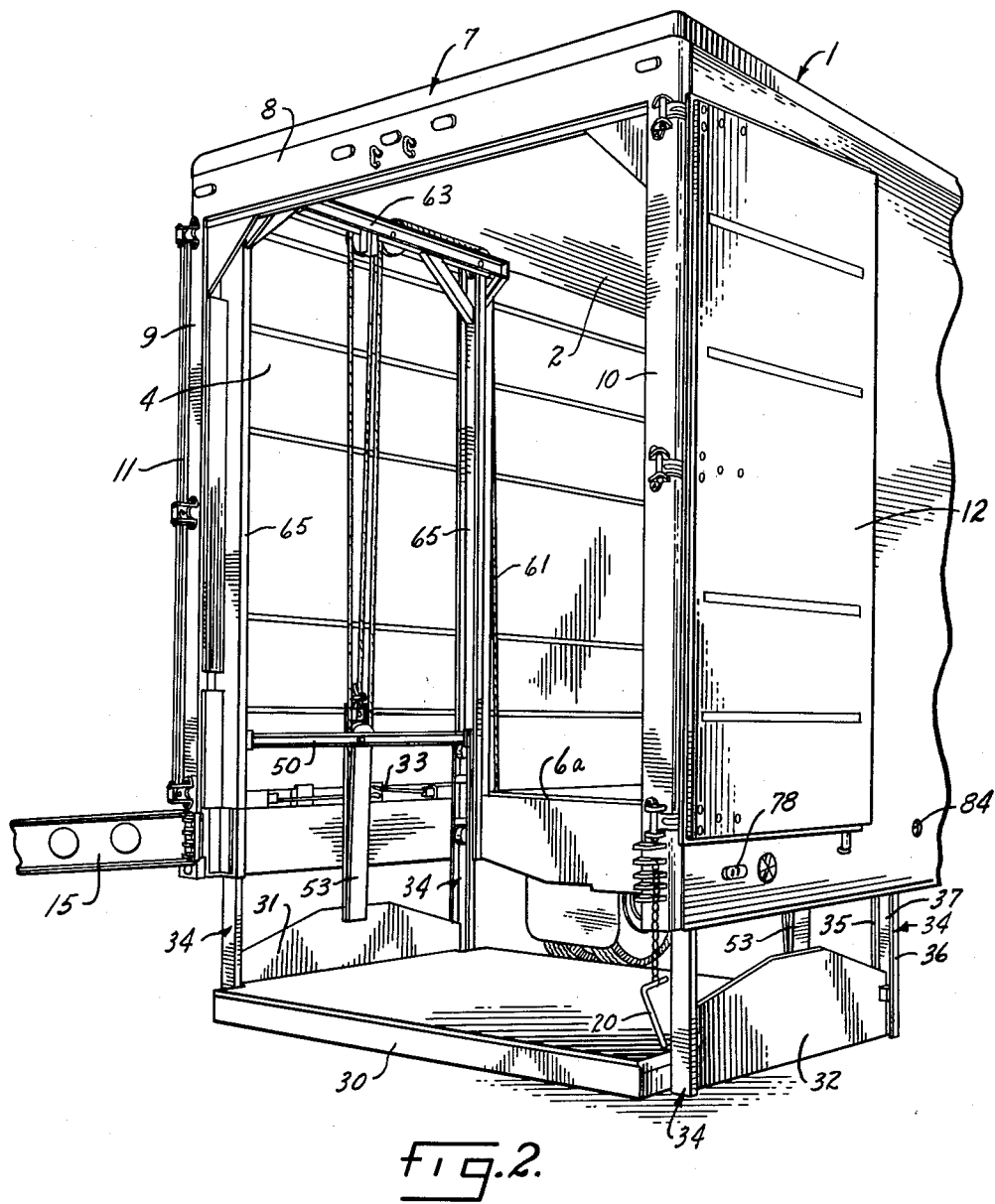

I illustrate my invention more or less diagrammatically in the accompanying drawings, wherein:

FIGURE 1 is a rear elevation;
FIGURE 2 is a perspective view illustrating the elevator portion of my invention in another position;
FIGURE 3 is a detail view, on an enlarged scale and with parts broken away;
FIGURE 4 is a detail view on a further enlarged scale; and
FIGURE 5 is an illustration of a driving mechanism employed in connection with my invention.

Like parts are indicated by like numerals throughout the specification and drawings.

Referring now to the drawings, and particularly to FIGURE 1, the numeral 1 generally indicates a trailer body or superstructure. Indicated at 2 is a roof portion. 3 illustrates a forward wall. Side walls 4 and 5 join the roof 2, forward wall 3 and floor 6. A closure-supporting frame, indicated generally at 7, comprises an upper cross strip 8 and a pair of vertically disposed side strips 9, 10, the strips 8–10 extending inwardly from roof 2 and side walls 4, 5 respectively. Closure members 11, 12 are hingedly secured, respectively, to frame strips 9, 10 and are dimensioned to close the opening defined by frame 7. A bottom frame member 15 is hingedly supported on the lower ends of side frame members 9, 10 as indicated generally at 16, 17, respectively. Each of the hinge members 16, 17 comprises two sets of plurality of vertically spaced finger elements 18, 19 having vertically aligned apertures therein, one group of said spaced finger elements being secured to the associated frame strip and the second group of finger elements being secured to one end of closure frame member 15 and a pin 20 receivable in all of the overlapping apertures in said finger elements and carried, as by chain 22, on the associated frame strip 9 or 10.

The floor 6 extends from forward wall 3 rearwardly for a distance less than the length of side walls 4—5, the floor 6 terminating at a point inwardly spaced within the superstructure 1 from closure frame 7.

The horizontal space between the rear edge 6a of floor 6 and the closure frame portion 15 is completely filled by elevator floor 30. The floor 30 has end plates 31, 32 extending upwardly from its opposite longitudinal edges. Being dimensioned to fill the space between the floor 6 and closure frame 7, the elevator floor 30 is generally rectilinear in planar configuration.

A locking mechanism effective selectively to hold elevator floor surface 30 level with vehicle floor surface 6 is illustrated diagrammatically at 33.

The floor 30 has rising upwardly therefrom adjacent each of its four corners a guide and support member comprising a channel strip indicated generally at 34. Each of the guide members 34 comprises a pair of spaced sidewalls 35, 36 and a crosswall 37 extending therebetween. Rotatably supported on each of the members 34 is a pair of vertically spaced support rollers indicated at 40, 41. The support rollers have their axes extending between the sidewalls 35, 36 and their peripheral surfaces extending outwardly through openings 38, 39 in the wall 37. Guide rollers 42, 43 are also vertically supported on members 34 and have their axes extending in perpendicular relationship with the axes of rollers 40, 41 and supported by wall 37 and parallel cross strips 37a. Rollers 42, 43 have their peripheries extending outwardly through openings, in opposite directions, beyond sidewalls 35, 36. While I illustrate one of members 34 in detail in FIGURE 4, it will be realized that each of the four members 34 is substantially identical with that illustrated in FIGURE 4.

The two members 34 at one end of the elevator floor 30 have their upper ends joined by a pair of spaced, back-to-back channel members 50 extending therebetween and secured thereto, the member 50 overlying, in upwardly spaced relationship, the upper edge of plate 31. Similarly, the members 34 at the opposite end of floor 30 have a cross member 51 joining their upper ends and overlying, in upwardly spaced relationship, the upper edge of side plate 32.

Each of the channel members forming member 50 has secured adjacent a central portion thereof and extending downwardly therefrom a hanger strip 53, the member 51 having similar hanger strips 53 extending downwardly therefrom. Each pair of hanger strips 53 has its lower ends secured, as by welding, for example, to an end plate 31 or 32.

A positioning mechanism for the structure described comprises a structure carried by the vehicle and having substantially identical elements associated with each of the vehicle sidewalls 4, 5. For convenience, I describe below the structure associated with wall 4, it being understood that the structure associated with wall 5 is substantially identical therewith.

Rotatably positioned between the channel members forming member 50, for example, and at a point intermediate the ends thereof, is a pulley member 60. The outer strip 53 at both ends of the elevator floor 30 has a portion 53a extending upward above the member 50 or 51 and carrying a connector block 53b. A cable 61 has one of its ends connected to member 53b and extends upwardly therefrom to encircle a pulley 62 rotatably supported on an upper cross member 63 of a fixed frame indicated generally by the numeral 64. The frame 64 is fixed to wall 4 beyond the rear edge of floor 6 and extends from a point below floor 6 to a point adjacent roof 2. The frame 64 further comprises a pair of spaced guide rail members extending from a point beneath the floor 6 to a point immediately adjacent the roof 2, the guide rail members comprising inwardly directed channels 65, the base wall of which is contacted rotatably by rollers 40, 41 and the side walls of which are contacted rotatably by rollers 42, 43, the roller-supporting uprights being of sufficient height and the rollers being spaced above the elevator surface 30 to insure contact of rollers 40–43 with channels 65 when elevator 30 is at its lowest or ground-contacting position.

The cable 61, after its excursion about pulley 62, continued downwardly to engage pulley 60 from which it extends upwardly again toward pulley 66 mounted on member 63 and about which cable 61 is turned. From pulley 66 the cable 61 proceeds forwardly and substantially horizontally to a corner pulley 67 mounted on frame 64 from whence cable 61 extends downwardly through the floor 6 in a path forward of the forward channel 65 of frame 64.

Referring now to FIGURE 5, I illustrate, substantially schematically, a power mechanism for operating the elevator of my invention. The cables 61 are each turned about a pulley 70 rotatably mounted beneath floor 6 of vehicle 1 and are each thereafter directed to and about a pulley 71 from whence they are directed to a winch drum 72 to which they are attached. Drum 71 has an extended shaft 72a on which a gear 73 is fixed.

A worm gear 74 is driven through speed reducer 75 by reversible motor 76 and is in engagement with gear 73. A conductor 77 extends from motor 76 to a socket 78 which may be mounted in a sidewall 5 of vehicle 1 for ease in supplying an electrical source of power, for example, to reversible motor 76.

A gear 80 is also mounted on shaft 72a and is engaged with a gear 81 which is in turn mounted on shaft 82. A hand crank 83 may be removably engaged with and for rotation of shaft 82 through the media of an opening or clutching device illustrated schematically at 84.

Whereas I have described and claimed an operative device, I wish it to be understood that this showing is to be taken in an illustrative or diagrammatic sense. There are many modifications of the invention that will fall within the scope of the invention that will be apparent to those skilled in the art. The scope of the invention, therefore, should be limited only by the scope of the hereinafter appended claims.

The use and operation of my invention are as follows:
The vehicle 1 may be positioned adjacent to source of electrical power. In that event the operator merely connects such source of electrical power to the vehicle as at 78. Thereafter, through a suitable source of electrical controls (not shown) the elevator surface or floor 30 may be lowered to ground position and items to be transported in vehicle 1, such as furniture and the like may be easily loaded upon platform 30. The electrical controls are thereafter operated to raise the elevator 30 to the desired level of loading such as those levels illustrated in FIGURES 1 and 3 for example. The same is true with respect to the unloading operation of the vehicle 1.

Should a source of electrical energy be unavailable the elevator of my invention may be driven by means of hand crank 83 and shaft 82 as illustrated schematically in FIGURE 5.

The elevator of my invention may be positioned at a plurality of points from ground level to the upper level of vehicle 1, any suitable locking mechanism being provided for winch 72.

The elevator of my invention forms a portion of floor 6 for transportation of items carried in vehicle 1.

I claim:
1. A vehicle comprising a floor, a pair of spaced side walls uprising from opposite longitudinal edges of said floor, a roof joining said side walls at their upper edges, said side walls and roof each extending an equal distance beyond one end of said floor, ground contacting members positioned beneath said floor and supporting said floor, side walls and roof above the ground, a pair of spaced parallel guide rails mounted on the inner surfaces of said side wall extensions, each of said guide rails extending from a point beneath the upper surface of said floor to a point adjacent said roof, a support member bridging the upper ends of each said pair of rails immediately beneath said roof, a pulley assembly mounted on each of said support members, a generally rectilinear platform having a dimension substantially equal to the width of said floor and another dimension substantially equal to the extension of said side walls and said roof, a frame assembly upstanding from each of the opposite ends of said platform, each said frame assembly being slidably mounted in one of said pairs of rails, a second pulley assembly mounted on an upper portion of each of said frame assemblies, a winch and means for operating it mounted beneath said floor, a cable wound about said pulley assemblies on each of said support members and each of said frame assemblies, each of said cables passing through said floor and about said winch, said frame assemblies having a height substantially less than the height of said side wall extensions whereby said platform may be moved between a ground-contact position and a level substantially above the level of said floor.

2. The structure of claim 1 wherein each of said frame assemblies comprises a pair of spaced parallel uprights dimensioned for sliding engagement within said rails, a pair of rollers rotatably mounted in each of said uprights for rolling contact with one of said rails, a cross member joining the upper ends of each pair of said uprights, said second pulley assembly being mounted intermediate the ends of said cross member, a side plate extending between said uprights adjacent the lowermost portions thereof and a tie brace joining said side plate to said cross member in alignment with said second pulley assembly.

References Cited in the file of this patent
UNITED STATES PATENTS

| | | |
|---|---|---|
| 2,391,580 | Mackmann et al. | Dec. 25, 1945 |
| 2,440,681 | Gordon | May 4, 1948 |
| 2,513,355 | Peckinpaugh | July 4, 1950 |
| 2,536,080 | Patton | Jan. 2, 1951 |
| 2,635,711 | Black | Apr. 21, 1953 |

FOREIGN PATENTS

| | | |
|---|---|---|
| 443,253 | Great Britain | Feb. 25, 1936 |